UNITED STATES PATENT OFFICE.

STEPHEN M. ALLEN, OF WENDELL, MASSACHUSETTS.

RECOVERING AND UTILIZING WASTE RUBBER.

SPECIFICATION forming part of Letters Patent No. 375,436, dated December 27, 1887.

Application filed May 3, 1887. Serial No. 236,003. (No specimens.)

*To all whom it may concern:*

Be it known that I, STEPHEN M. ALLEN, of Wendell, in the county of Franklin and State of Massachusetts, have invented a new and useful Improvement in Recovering and Utilizing Waste Rubber, which improvement is fully set forth in the following specification.

This invention relates to the devulcanization and utilization of waste rubber or scrap, such as old rubber boots and shoes, hose-pipe, rubber-coated cloth, and the like. It includes a new mode of and materials for treating such rubber scrap, as well as the vulcanizable compound resulting therefrom, which is a cheap and efficient substitute for rubber.

According to my invention, the rubber scrap, refuse cuttings, or second-hand fabric is first thoroughly cleaned, and is ground or disintegrated in any suitable way. It is not necessary, according to my process, to resort to any means to remove the fiber from this mass, as the fibrous material is in course of treatment converted into gelatine, and its presence becomes not merely unobjectionable but in reality advantageous. The ground or disintegrated mass is treated with a solvent, of which a non-volatile oil or spirit—such as Trinidad asphalt spirit—is an essential component. Sulphur is also added to the solvent, which possesses all the advantages of naphtha, or other known solvent of rubber without volatility. Instead of sulphur the solvent or spirit may be treated with fumes of sulphur or of charcoal, or with dilute sulphuric acid or alum. Enough of the solvent is used to readily dissolve the mass of prepared scrap, and the mixture is then heated for a proper time until the mass is thoroughly devulcanized and the fiber converted into gelatine. The non-volatile solvent remains an essential part of the resulting compound, imparting valuable characteristics thereto, and is not evaporated and driven off as in other processes. To this vulcanizable mass may be added pure rubber or any other gum or oil or substance which will improve the compound or specially adapt it to any particular use, as well understood by manufacturers of rubber articles.

In order that the invention may be fully understood I will describe in detail the manner in which it is or may be carried into effect, premising, however, that the particular proportions and materials specified are given by way of example, and not to limit the invention thereto.

In preparing the solvent for devulcanizing the rubber and gelatinizing the fiber contained therein I preferably make a mixture composed of equal parts by weight of a non-volatile oil or spirit, (such as above mentioned,) asphalt, and resin. The resin is first boiled in soda ash or carbonate of lime for about three hours and the other ingredients then added. The mixture is cooled to about 150° Fahrenheit, and at this temperature is added, say, one-half in weight of the cleaned and ground or disintegrated rubber stock or scrap. To this I prefer to add one ounce of sulphur and one ounce of litharge for every pound of the mass. The temperature of the mixture is then gradually raised to above the boiling-point, and is heated for about six hours, when the temperature is finally raised for a few moments to 300° Fahrenheit, by which time the mass has become perfectly devulcanized and the fiber contained therein has been converted into gelatine. It is advantageous to keep the mass at a temperature below the boiling-point for a few hours, when the operation is complete, and the result is a vulcanizable compound that may be usefully employed as a substitute for rubber.

I sometimes add to the mass a small quantity of tannic acid or alum to convert the gelatinized fiber into tannate of gelatine. This gelatine renders the mass more elastic and flexible, and also gives it additional toughness.

The further treatment or utilization of this substance may be such as ordinarily practiced in making rubber articles. It may be treated in a grinding-machine while devulcanizing until sufficiently refined to sheet out between rollers with mixtures of rubber or other vulcanizable substance.

Modifications may be made in carrying out the process without departing from the spirit of the invention. For example, the litharge may be omitted altogether or lead substituted therefor. I find it advantageous sometimes to add a small quantity of naphtha or spirits of turpentine to the non-volatile oil or spirit.

I claim—

The method of utilizing rubber scrap and converting it into a vulcanizable compound by preparing a mixture of non-volatile oil, asphalt, and resin with sulphur or its equivalent, adding disintegrated scrap thereto, and heating the mass for a proper time, substantially as described.

In testimony whereof I have signed this specification in the presence of two subscribing witnesses.

STEPHEN M. ALLEN.

Witnesses:
  EDGAR HOWARD,
  FRED. J. WOOD.